Patented Nov. 22, 1949

2,488,560

UNITED STATES PATENT OFFICE 2,488,560

STRUCTURE OF CONTACT MASSES

Otto Reitlinger, Kew Gardens, N. Y.

No Drawing. Application November 25, 1946, Serial No. 712,047

38 Claims. (Cl. 252—472)

The present invention relates to the structure of contact masses and this application is a continuation-in-part of co-pending application, Serial Number 651,979, filed March 4, 1946.

The activity of a contact mass is determined by:

(1) The degree to which the energy of activation necessary for causing a given reaction is reduced by the catalytically acting substance. This activating property, which depends on the chemical nature of the compound or compounds to be used as catalysts, determines the course of the reaction.

(2) Its efficiency, which is defined as the amount of employed compounds which react at a given temperature and a given pressure per unit of volume of reactor space filled with the catalytic mass, and per unit of time. This latter property is controlled by the physical structure of the contact, and can be changed and improved.

The primary object of this invention is to provide contact masses of improved efficiency—as defined sub (2)—and methods for preparing same.

The application of non-volatile catalysts in powder form for heterogeneous reactions suffers from the severe disadvantage that powders clog the reactor space and inhibit the homogeneous passage of gases and liquids through the reactor. The following methods have been described for obviating these difficulties:

(1) The method of the fluid catalysts: It is confined to rugged catalysts and also as to the size of the particles. Furthermore the difficulties of separating the catalyst particles from the reacting gases increase with decreasing size of the particles.

(2) Mixing the catalysts in powder form with inorganic fibers such as glass wool, asbestos, mineral wool and the like, whereby the difficulties arise of reproducing the same efficiency in different batches of the catalytic mass, and also of obtaining in this way a completely homogeneous efficiency of the catalyst per unit volume throughout the reactor. Electro-microscope pictures of such catalytic masses (J. Turkevitch, Journ. of Chem. Physics, vol. 13, 1945, p. 238) reveal that a small fraction only of the surface of such inorganic fiber masses is covered with the catalyst and a large portion of the free reactor space is bare of catalyst powder.

(3) Compounding the powder of the catalyst into shapes with or without subsequent sintering: By pelleting such powders the pores and the voids in between the particles are reduced, and the time necessary for the gases to diffuse through these pores is increased and the necessary space velocity decreased, which is equal to reducing the yield that can be obtained at a given space velocity. Also a method of employing relatively low pressures for molding such bodies from powders, as was recently described, cannot prevent such undesirable reduction of the active space and of the size of the pores. By admixing inactive ingredients of the powders of catalytically active substances the active part of the internal surface is substantially reduced, thus reducing the efficiency.

According to my invention a novel structure of the contact is used which maintains the advantages of a powdery catalyst without having the aforesaid disadvantages. The novel contact mass is composed of individual granules to which is firmly bonded a homogeneous surface layer completely covering the granules, and consisting of coherent particles of the catlytic powder. This surface layer of the granules is formed by the discrete coherent particles of the catalytically active powder immobilized in a stable packing arrangement the size of the pores of which is of essentially the same order of magnitude as would be presented by a layer of loose particles of the same powder. As a filling of a reactor for the catalytic activation of chemical reactions in fluids, the novel contact mass forms, by means of the voids between the granules, a lattice or network of communicating channels which allow to control the hydrostatic conditions for the regular and homogeneous flow of fluids through said reactor. The walls of these channels consist of highly porous packings of a particulate catalytically active substance and wherever the molecules of the reactants contact the network of the catalytic powder, they will react.

A particular advantage of the novel contacts is that they provide a homogeneous and immobilized distribution of small particles of catalytic powder firmly adhering to each other in predetermined distances and forming the walls of channels which are homogeneously distributed throughout a given reactor space.

Another advantage of the novel contacts is a particularly favorable relation between the size of the pores and the magnitude of the inner active surface of the active surface layer of the contact. It is known that the relation between the size of the pores and the active inner surface has a bearing on the efficiency of the contact. In the packing arrangement of the powder particles forming the active surface layer this relation is controlled by the size of the particles of the catalytic powder. The greater the size of the particles of the employed powder is, the greater are the pores and the smaller is the inner active surface, and vice versa.

A further characteristic advantage of the contacts according to my invention is that the inner surface of the active surface layer is wholly composed of catalytical material, and is not interrupted by inactive or less active areas of the carrier material.

In my copending patent application, Ser. No.

651,979, I have disclosed a method for preparing specific contact masses of the structure hereinbefore described.

According to this method, a porous granular support of non-metallic or of metallic carrier material is impregnated with a hydrophilic metal compound, forming a bonding or ground layer. The impregnated support has in addition a surface layer of a similar metal compound formed of discrete coherent particles firmly adhering to, and completely covering, said impregnating inner bonding ground layer. This surface layer is applied to the impregnated cores in the form of diminutive particles giving the surface layer a porous structure the mechanical strength of which is increased, if necessary, by causing the powder particles to cohere or to bake together by heat treatment. The novel catalyst of my invention is characterized by a porous support upon which individual particles of the catalyst, for instance applied as a powder or dust, form a homogeneous, uniform, and coherent active outer layer. Preferably, the contact mass consists of a porous granular support which carries the active material in two physically different layers of the same or a similar composition. The inner layer covers the inner and outer surfaces of the porous carrier in the usual way, i. e. the coating is not completely coherent but interrupted at least by the pores of the carrier, whereas the outer catalytic layer covers uniformly the whole surface.

It is not possible to obtain a uniform coherent surface layer, as defined hereinbefore, upon a porous carrier by merely coating or impregnating the carrier with the catalytic material. If the carrier, even in a moist state, is treated with the catalyst in powder form, the powder does not adhere to the carrier so firmly as to form a homogeneous coating. If the carrier is impregnated with a solution or suspension of the catalytic substance and afterwards dried by heating, the coating shrinks and the surface consists more or less of alternating areas formed by the catalyst proper and by the material and the pores of the support. Heretofore, it was even presumed such a structure of the surface of a contact mass was particularly efficient (cf. e. g. the book "Catalysis," by Berkman, Morrel and Egloff, 1940, pp. 456–482 where the favorable influence of the pores of the carrier material upon the efficiency of the catalyst is described).

In order to obtain a coherent and homogeneous coating of a catalytic powder upon a carrier, it is necessary to increase the adhesion of the catalytic material to the support. According to this invention, this increased adhesion is obtained by a suitable pre-treatment of the support, for instance by impregnating it with a hydrophilic material or, preferably, by precipitating from a solution an intermediate layer of the catalytic or a similar material upon the support. If subsequently a powder of the catalytic material is applied to the impregnated support, it adheres firmly thereto. In this way, a contact mass is formed which, even under the microscope, has a completely uniform and homogeneous appearance and a catalytic efficiency by far superior to contact masses consisting of the same support and the same catalyst but prepared by impregnation only or by powder coating only.

The impregnating ground layer and the surface layer may consist of ferric oxide. In one or both layers the ferric oxide may be replaced, wholly or in part, by other oxides or mixtures of oxides such as chromium sesquioxide, vanadium sesquioxide, cobalt oxide, thorium oxide, or other oxides of the transition metals known for their catalytic activity. In this way, mixed catalysts are obtained, and depending on the specific metal oxides which are used as catalysts it is possible to predetermine the energy of activation which shall be applied to the reaction. This permits of controlling the degree of oxidation or dehydrogenation at which it is desired to stop the reaction. The efficiency of the catalyst is, however, controlled and determined by the size of the particles of the catalytic powder, by the thickness of the outer layer formed by this powder, and by the size of the grains of the carrier material.

In its broadest form, this method may be defined as providing a contact mass which consists of a catalytic surface layer surrounding grains of a carrier material, said method comprising the steps of combining with the carrier a bonding substance causing the catalytic surface layer to adhere to said grains and subsequently treating said grains with a catalytic agent in powder form until they are completely and firmly covered with a coherent layer of said powder.

The ordinary contact masses prepared by merely impregnating a carrier with the catalytic agent and drying it show, under the microscope, a chessboard-like surface formed by alternating zones of catalytic and carrier material. These alternating zones correspond to areas of different catalytic efficiency, the reaction being confined to the zones covered by the catalyst.

In contradistinction to these contact masses prepared by impregnation only, the contact masses obtained according to this invention have a coherent porous outer packing arrangement wholly composed of the catalytic agent and not interrupted by inactive areas of the carrier material. The inner and outer surfaces offered to the reacting gases are wholly composed of catalytic material and, therefore, greatly increase the reaction rate.

Cohering, or baking together, of the small powder particles composing the outer layer may, if necessary, be brought about by the action of hydrogen chloride and oxygen at elevated temperatures or by heating only; the best way will depend on the physical and chemical properties of the particular substances that are used for activating the reactions hereinafter described.

When for instance the granules are covered with such substances which are catalysts for the Deacon reaction the mechanical strength of these active surface layers can be increased, without substantially reducing the size of the pores and the active inner surface of the active surface layer by subjecting the granules to the action of hydrogen chloride and oxygen at elevated temperatures. A possible explanation for the surprisingly increased activity of the new contact masses may be as follows: When the impregnated granules of a carrier are agitated in a humid atmosphere with the powder of a catalytic material, the particles of this powder adsorb water vapor and will adhere to each other and form a coherent layer around the granules; when this layer is then allowed to cohere or to bake together, for instance by subjecting the granules to the action of hydrogen chloride and oxygen at elevated temperatures, it will be converted to an extremely porous shell surrounding the granules of the carrier and wholly composed of catalytic material.

It appears that the mechanical stability of the outer shell or surface layer at normal temperatures is maintained by the adsorption of water vapor by the hydrophilic intermediate impregnation layer, and by the adsorption of water vapor by the internal surface of said shell or surface layer, the internal surface of which is formed by the pores or interstices in between the individual catalytic powder particles. In the reactor, the water vapor will be desorbed but the powder particles will cohere to each other and adhere to the support under the action of the elevated temperature; as soon as the granules leave the reactor, they readsorb water vapor and the original state is reestablished.

I have further discovered that said novel structures of catalytic masses can also be applied with great advantage to the building up and combining of catalytic masses, the catalytically active constituents of which are metals and alloys in the pure state or still containing some other compounds, as oxides and chlorides and also metals containing carbides or other components affecting and determining their activating quality as defined sub (1) supra.

The preparation of the novel catalysts and their use will now be described in greater detail by means of the following examples for oxidation, chlorination, dehydrogenation and cyclization reactions, as well as for addition reactions, for hydration, for hydrogenation and for alkylation reactions. The properties and efficiencies of some of the representative ones are illustrated in comparison with the same catalysts of the same chemical composition but prepared according to the previously known methods. All parts are by weight unless otherwise stated. It will be understood that the invention is not limited to those specific embodiments and particular data given since the examples are given primarily for purposes of illustration and the invention is to be construed as broadly as the appended claims permit.

EXAMPLE I

Granules of suitable size of any of the known porous carrier materials such as fuller's earth, silica gel, and the like, but preferably granules of pumice within the range of 20 to 60 mesh are allowed to stand in a concentrated aqueous ferric chloride solution for a period of about 24 hours. They are then separated from the remaining ferric chloride solution and dried at a temperature of about 180° C. These grains are filled into a tube through which gaseous ammonia is passed slowly for a period of about one hour. The grains are then brought into concentrated aqueous ammonia and left therein for about 24 hours.

The aqueous ammonia is then decanted and the grains are washed until red litmus paper retains its color and the water suspended precipitate of ferric hydroxide has been removed with the wash water. The grains are dried at a temperature of about 200° C. and filled into a reactor tube in which they are subjected, at a temperature of about 490° C. and for a period of about 2 hours, to the action of a gas stream containing about ten parts by volume of air and about four parts by volume of hydrogen chloride. The flow velocity of the gas stream is immaterial; I prefer to apply a space velocity of about 3.25 per minute.

After cooling, the contact mass proper is prepared by shaking the impregnated grains with ferric oxide, e. g. in a proportion of 40 parts of ferric oxide to 60 parts of impregnated grains. The ferric oxide is preferably applied in the form of a fine powder, for instance so fine that 95 per cent pass through a sieve of 325 mesh. The powder is gradually added to the grains in a humid atmosphere, which may be super-saturated with water vapor. In this way, the grains adsorb a certain amount of water and hold the ferric oxide powder firmly upon their surface. If this operation has been properly done the walls of the shaking vessel should not show more than slight traces of the ferric oxide; the humidity should be controlled in such a way that the finished grains do not leave behind more than scant traces of ferric oxide when sliding over dry glass or smooth paper. This is a good indication that the ferric oxide layer adheres sufficiently to the pumice supports. Microscopic observation of the grains shows that they are completely covered with a dense, velvet-like layer and do not show any free spots; each grain presents on its surface the aspect of a sponge, the small particles of the ferric oxide powder forming the innumerable walls thereof.

145.5 grams of the above specific mass, containing about 58 per cent of impregnated pumice grains, about 39 per cent of ferric oxide applied in powder form, and about 3 per cent of water, are loaded into a vertical pyrex glass tube of 26.5 mm. I. D. over a length of 294 mm. The part of the tube above the contact mass is filled with small pieces of stoneware over a length of about 235 mm. and serves as a preheater.

The reactor is heated at a temperature of about 490° C. and the preheater is brought to a temperature of about 440° C. After passing a gas mixture containing about 10 parts by volume of air and about 4 parts by volume of hydrogen chloride through the tube for a period of about 2 hours, the reactor is ready and fit to be used for oxidation and chlorination or other processes.

EXAMPLE II

Table I shows the results of various runs made in the reactor and with the contact mass described in Example I, for the chlorination of methane by means of hydrogen chloride and oxygen in air according to the reaction $$CH_4 + xHCl + x/2\ O_2 = CH_{4-x}Cl_x + H_2O$$

wherein $x$ stands for any integer from 1 to 4.

Table I

[Gas mixture by volume: $CH_4$ : HCl : air = 4:4:10]

| Run No. | Temperature | | Flow Velocity | Space Velocity | Percentage-Yield | |
|---|---|---|---|---|---|---|
| | Reactor | Preheater | | | HCl basis | $CH_4$ basis |
| | °C. | °C. | Cc./min. | | | |
| A | 491 | 400 | 389 | 2.46 | 55.80 | 29.90 |
| B | 491 | 400 | 507 | 3.24 | 56.20 | 30.12 |
| C | 491 | 430 | 507 | 3.24 | 56.92 | 30.53 |
| D | 491 | 440 | 651 | 4.16 | 54.25 | 30.30 |

The chlorinated end product consists of about 23.50 per cent of methyl chloride, 43.50 per cent of methylene chloride, 28 per cent of chloroform, and 5 per cent of carbon tetrachloride. The table shows a uniform and very high conversion of 54 to 57 per cent with respect to the hydrogen chloride and of about 30 per cent with respect to the methane.

Whereas Table I shows the results obtained with the novel contact mass, Table II gives the results of control tests made with the same reactor, for the same reaction, under exactly the same experimental conditions, and with the same chemical compound, ferric oxide, as a catalyst. The ferric oxide was used as such or precipitated on various porous carriers in accordance with standard methods of preparation.

EXAMPLE III

Table III shows the results of two runs made for the chlorination of ethylene by means of hydrogen chloride and oxygen or air according to the reaction $$C_2H_4 + xHCl + x/2\ O_2 = C_2H_{4-x}Cl_x + xH_2O$$

wherein $x$ stands for any integer from 1 to 4. The runs were made with the same catalyst material and in the same reactor as the runs of Table I.

Table III

| Run No. | Temperature | | Flow Velocity | Space Velocity | Gas Mixture by volume | | | Percentage Yield | |
|---|---|---|---|---|---|---|---|---|---|
| | Reactor | Preheater | | | $C_2H_4$ | HCl | Air | HCl Basis | $C_2H_4$ Basis |
| | °C. | °C. | Cc./min. | | | | | | |
| E | 491 | 440 | 510 | 3.26 | 4 | 4 | 10 | 57.73 | 26.96 |
| F | 491 | 440 | 452 | 2.9 | 2 | 4 | 10 | 48.82 | 44.90 |

Table II

[Gas mixture by volume : $CH_4$ : HCl : air = 4:4:10]

| Run No. | Temperature | | Flow Velocity | Contact mass | Percentage-Yield | |
|---|---|---|---|---|---|---|
| | Reactor | Preheater | | | HCl Basis | $CH_4$ Basis |
| | °C. | °C. | cc./min. | | | |
| G | 491 | 391 | 469 | $Fe_2O_3$ powder on pumice (mesh 60) prepared by shaking in humid atmosphere. | 8.05 | 4.3 |
| H | 491 | 400 | 505 | Fuller's earth (mesh 40) impregnated with $Fe_2O_3$. | .83 | .45 |
| I | 491 | 391 | 506 | $Fe_2O_3$ Hematite crystals (mesh 20). | 5.98 | 3.2 |
| J | 491 | 391 | 379 | $Fe_2O_3$ amorphous mineral grains (mesh 20 to 60). | 1.14 | .6 |
| K | 491 | 400 | 513 | Grains of pumice (mesh 20 to 60) impregnated with $Fe_2O_3$. | 10.0 | 5.0 |
| L | 491 | 400 | 507 | Silica Gel (mesh 14 to 20) impregnated with $Fe_2O_3$. | 5.0 | 2.5 |
| M | 487 | 400 | 125 | $Fe_2O_3$ powder on pumice (mesh 80 to 120) prepared by shaking in humid atmosphere. | 16.05 | 8.2 |

In runs H, K, and L, the impregnation of the supports was carried out in the same way as described in the first part of Example I (supra) but without shaking the impregnated grains with the ferric oxide powder.

A comparison of Table I and Table II shows that pumice grains impregnated with ferric oxide according to known methods convert 10 per cent of the hydrogen chloride (run K) whereas the novel catalyst, under exactly the same conditions, brings about a conversion of 56 to 57 per cent (runs A—D).

Table II shows further that the same poor results were obtained by using ferric oxide without a carrier (runs I, J) or by applying ferric oxide powder to an unimpregnated carrier (run G). Even when in the latter case the chlorination is carried out at very low and uneconomic gas velocities (run M) the yields are less than a third of those obtained with the new catalyst at normal velocities.

In run E, the chlorinated end product consists of 16 per cent vinyl chloride, 33 per cent dichloroethylene, 46 per cent trichloroethylene, and 5 per cent tetrachloroethylene. For run F, the corresponding figures are 16, 35, 37, and 12 per cent.

If the catalysts of Table II are used, hardly 10 per cent of the hydrogen chloride can be converted to chlorinated olefines whereas under the same conditions the novel catalyst brings about a conversion of 57.73 per cent for equal parts by volume of hydrogen chloride and ethylene resp. of 48.82 per cent for a ratio of ethylene to hydrogen chloride of 2:4.

In the experiments reported in the foregoing examples and tables the chlorinated compounds were removed from the gases by cooling them to a temperature of −78° C. At this temperature a considerable part of the obtained methyl chloride and vinyl chloride was not yet condensed because of their still high vapor pressures at −78° C. and their low concentrations in the exit gases due to the dilution with the nitrogen contained in the used air. The total of these chlorinated products is readily recovered by condensing at temperatures lower than −78° C. or at pressures higher than atmospheric pressure, or by using oxygen instead of air. In such a case, e. g. in commercial production, the yields will be considerably higher than those indicated in the tables. For the chlorination of methane under the conditions of runs B and C of Table I, and for the chlorination of ethylene under the conditions of run E of Table III the conversion of HCl is then about 70 per cent.

The chlorination of saturated or unsaturated aliphatic and cyclic hydrocarbons and the composition of the chlorinated products is controlled by the nature of the hydrocarbon and the ratio between hydrogen chloride and hydrocarbon introduced into the reactor. The greater this ratio is, the greater will be the proportion of higher chlorinated hydrocarbons in the end product. The novel catalysts can also be used with advantage for the chlorination of other than aliphatic hydrocarbons. The chlorination of benzene, for instance, is readily obtained in this way, and the hydrogen chloride is wholly combined with the benzene to phenyl chloride when a sufficient excess of benzene is used.

Chlorination is only a specific case of the general group of oxidation reactions. The novel catalyst can, therefore, be used generally for oxidation reactions in the gaseous phase. In many cases where the known oxidation catalysts were not active or efficient enough for industrial application, it can be expected that with the aid of the new catalysts prepared according to this invention the reactions will be carried out on a commercial scale. The novel catalysts can, for instance, be employed for the oxidation or dehydrogenation of hydrocarbons or for the ring formation from paraffins, i. e. benzene from hexane or toluene from heptane.

Though the new catalyst and the method of preparing it has been illustrated by the example of ferric oxide, other metal oxides or metal compounds may be used and prepared in the same way, either for both or only for one of the surface layers upon the carrier material. Grains of a porous carrier are first impregnated with ferric oxide as described above and then shaken with another metal oxide in powder form, for instance with chromium or manganese sesquioxide, or vice versa; in this way, mixed catalysts of high efficiency and specific activity are obtained.

The contacts described hereinbefore are particularly useful with respect to the oxidation of organic compounds when it is desired to prepare certain oxidation products with the exclusion of others, as for instance in the oxidation of toluene to benzaldehyde with vanadium oxide as a catalyst.

It is also possible to prepare mixed catalysts by applying to the impregnated granules of the carrier a mixture of powders of suitable metal oxides. These powders may be prepared either by merely mixing the powders of different metal oxides or by co-precipitating different metal oxides and subsequently converting the precipitate to a powder. A mixture of the powders of chromium and molybdenum sesquioxides is suitable for the dehydrogenation and cyclization of heptane to toluene.

Oxidation and chlorination reactions are strongly exothermic. The usual carrier material for catalysts has a very low thermal conductivity; it is, therefore, often difficult to maintain the optimum temperature for a catalytic reaction within the contact mass and to avoid local overheating and decompositions of the reaction products. This drawback can be obviated by using a porous metallic carrier material of high thermal conductivity.

A metal carrier must be used for which the electromotive force of the oxidation reaction to the lowest oxidation stage ranges in the electromotive force series below the electromotive force of the reduction reaction for the metal oxide which is used as the catalyst, to the next lower oxidation stage. Therefore, bronze is suitable as a carrier for chromium sesquioxide but not for ferric oxide.

The surface of the porous metal carrier must be pre-treated by impregnation in the same way as described above for non-metallic carriers in order to obtain a firmly adhering surface coating of the powdered metal oxide or other catalytic compound. Porous metal as produced for various technical applications by sintering metal powder ("oilite" bearings, filter plates, etc.), de-oiled and sufficiently disintegrated, are a suitable carrier material.

EXAMPLE IV

The addition reaction of ethylene and hydrogen chloride to form ethyl chloride:

$$C_2H_4 + HCl = C_2H_5Cl$$

145.5 grams of the contact mass, prepared according to Example I, containing about 60 per cent of impregnated pumice grains and about 40 per cent of ferric oxide applied in powder form, are loaded into a vertical tube of 26.5 mm. I. D. over a length of 294 mm.

The steps of subjecting the impregnation layer and the surface layer to the action of hydrogen chloride and oxygen, as described in the Example I, are optional and may be dispensed with. If, however, these two steps are carried out, the grains, before serving as catalysts for this reaction, have to be freed of chlorine which has been taken up, e. g. in the form of ferric oxychloride. A stream of oxygen or air is passed over the grains at about 490° C. until the leaving gases do not contain any more chlorine. This step can be shortened by admixing methane or another suitable hydrocarbon to the stream of air.

A gas stream of about 500 cc. per minute of dry ethylene and dry hydrogen chloride is passed through the tube at atmospheric pressure. The employed gas mixture is by volume $$C_2H_4 : HCl = 1 : 1.1$$

The gases enter the reactor at room temperature, i. e. at about 25° C. and care has to be taken that the internal temperature in the center of the reactor does not rise substantially over about 60° C. The resulting ethyl chloride is separated from the exit gases in known manner. The conversion rate on the basis of ethylene is about 95 per cent.

Control tests were made with the same reactor, for the same reaction, under exactly the same experimental conditions, and with the same chemical compound, ferric oxide, as a catalyst. The impregnation of the supports was carried out in the same way as described in Example I (supra) but without applying the surface layer of ferric oxide powder to the impregnated grains.

Hardly a 15 per cent conversion rate on the basis of ethylene could be obtained.

EXAMPLE V

For the addition reaction of acetylene and hydrogen chloride $C_2H_2 + HCl = C_2H_3Cl$ to form vinyl chloride at about 250° C., the following contact is used with advantage. Porous carrier grains are impregnated with, e. g., cupric chloride and then agitated with a fine powder consisting of about two parts of calcium chloride and one part of barium chloride. The advantage of this new contact resides in the fact that it allows to obtain good results without the admixture of mercuric chloride to the catalyst; vinyl chloride obtained over mercuric chloride contacts always contains traces of that compound, which have to be removed.

EXAMPLE VI

Preparation of acetone from acetylene and steam according to the equation:

$$2\ C_2H_2 + 3\ H_2O = CH_3COCH_3 + 2\ H_2 + CO_2$$

Grains of pumice of the size within the range of 20 to 60 mesh which previously have been provided with an impregnating inner ground layer of ferric oxide as described in Example I (supra) are provided with a surface layer by agitating them with a fine powder consisting of about equal parts of ferric oxide and zinc oxide. About 45 parts of said ferric oxide-zinc oxide powder are gradually applied to about 55 parts of the impregnated grains. The same vertical reactor as described in Example II is loaded over a length of 300 mm. and is brought to a temperature of about 470° C. 12 liters per hour of acetylene and about 15 grams of steam per hour are passed at this temperature through the reactor. From the condensate of the exit gases consisting of aqueous acetone, with traces of acetic acid, and acetaldehyde, acetone is separated by liquid/liquid extraction, to be stripped from the solvent by subsequent distillation. The yield of acetone on the basis of acetylene is about 60 per cent.

Control tests made with porous grains provided either with an impregnating ground layer only consisting of ferric oxide and zinc oxide or with a surface layer only consisting of the said compounds, gave as a result hardly a 10 per cent conversion rate on the basis of acetylene.

EXAMPLE VII

Hydrogenation of carbon monoxide, (Fischer-Tropsch Process).

As described in Example I of this application and in greater detail in my copending U. S. patent application, Ser. No. 651,979, grains of pumice, about half of them within the range of 20 to 40 mesh and half of them within the range of 40 to 60 mesh, are provided with an impregnating inner ground layer of ferric oxide. The material for the surface layer contains about ½% of potassium carbonate, 2½% of cupric oxide, 5% of manganese oxide and 92% of ferric oxide and is a fine powder, for instance so fine that 95% of same pass through a sieve of 325 mesh. This powder is prepared either by merely mixing powdered cupric oxide, manganese oxide, and ferric oxide in above proportions, but preferably by co-precipitating these compounds with potassium hydroxide and subsequently converting the precipitate after washing and drying into powder of 325 mesh. The powder mixture is soaked with an aqueous solution of potassium carbonate containing same in such concentration that the dried powder contains ½% by weight of this alkali. The soaked powder is dried and ground again to the size passing a sieve of mesh 325. The surface layer is applied to the impregnated grains—as described in Example I—by shaking them in a humid atmosphere with the powder mixture. 45 parts of this powder are gradually applied to 55 parts of the impregnated grains. As described in Example I, after the application of the impregnation layer and again after the application of said surface layer the grains are subjected to the combined action of hydrogen chloride and air at about 490° C. for about two hours. These steps serving to increase the mechanical strength of the surface layer may be dispensed with if such increase of the mechanical strength is not necessary or not desired. If, however, these steps are carried out, the grains have to be freed of chlorine taken up in the form of ferric oxy chloride and cupric oxy chloride as described in Example IV.

148 grams of the above described contact mass are loaded into a vertical tube of mild steel of 26.5 mm. I. D. over a length of 300 mm. The reduction is effected by passing through the tube dry carbon monoxide at a rate of 45 liters per hour for 11 hours at about 325° C. If an increase of the mechanical strength of the surface layer is desired the small iron particles of which it is composed are slightly sintered by passing hydrogen through the tube at about 400 to 500° C., but preferably at about 450° C.; this latter operation of sintering should be followed by a second treatment with carbon monoxide at about 325° C.

After reduction of the contact by means of carbon monoxide the temperature is lowered to about 230° C. and a gas mixture containing equal parts by volume of carbon monoxide and hydrogen is passed through the reactor at the rate of 509 cc. per minute, i. e. with a space velocity of 3.25 per minute. During the first 24 hours the contraction (being the percentage difference, between the initial volume of gas introduced and the final volume of gas leaving the reactor) increases gradually to approx. 50 per cent, whereupon it remains stable, and the average yield of hydrocarbons amounts to about 130 grams per cubic meter of employed water gas. About 60% of the obtained products are liquid hydrocarbons, about 20% are solid paraffins and the balance consists of hydrocarbons having more than two C-atoms in the molecule.

The reduction described in the present example can also be effected by means of water gas as used for the synthesis, i. e. with a mixture of equal parts by volume of carbon monoxide and hydrogen at a temperature of about 255° C.

Comparable results with an iron catalyst were reported only when using a pressure of 15 atmospheres (U. S. 2,257,457), whilst the working condition according to the given example is atmospheric pressure. When working under atmospheric pressure the highest yield reported, i. e. by the disclosure of U. S. 2,369,106 is 53 cc. of oil (about 48 grams) per cubic meter water gas and this with a space velocity of 1.67 per minute only, thus at half the space velocity of the given example.

Comparable results at atmospheric pressure are reported only with a cobalt-thorium oxide catalyst (Hall & Smith, Journ. Soc. Chem. Ind., 1946, pp. 128–136) and this with a space velocity of 1.09 per minute only, i. e. at one third of the space velocity of this example.

If, however, the cobalt-thorium oxide catalyst is prepared in the same manner as described in this Example VII the reaction can be carried out at a greater space velocity.

The advantage of the novel structure of contacts is not only the higher space velocity with which the reaction can be carried out but still a greater advantage for this specific example is the possibility to obtain the same results, or substantially the same results, under atmospheric pressure as were obtained heretofore under pressures of at least 10 atmospheres and higher. Moreover, as this specific reaction is very sensitive to temperature changes the problem of the temperature control for industrial production is not easy to solve when working at pressures of 10 atmospheres and higher.

Hereinbefore I have disclosed a method for a better control of the temperature for catalytic reactions, which consists in the use of a porous metallic carrier of high thermal conductivity instead of employing the usual porous carrier materials for catalysts having a very low thermal conductivity.

The limitation for the use of porous metallic carrier materials for catalysts the catalytically active constituents of which are metal oxides stated for oxidation reactions has to be reversed for catalysts the active constituents of which are metals, and for hydrogenation or reduction reactions, and may be stated as follows:

A metal carrier must be used for which the electromotive force of the oxidation reaction to the lowest oxidation stage ranges in the electromotive force series above—or is equal to—the electromotive force of the oxidation reaction for the metal which is used as the catalyst, to its lowest oxidation stage.

Porous iron granules are a suitable carrier material for the iron powder catalyst for hydrogenation reactions.

EXAMPLE VIII

Hydrogenation of carbon monoxide: Turnings of porous iron as obtained by any one of the known powder metallurgical processes and sufficiently disintegrated, for example, to the size given in Example VII, within the range of 20 to 60 mesh, are provided with an impregnating ground layer of ferrous oxide, as described in Example I, but without subjecting the impregnated turnings to the combined action of hydrogen chloride and air at elevated temperature. Then a surface layer is applied to the impregnated porous metallic grains by shaking them in a humid atmosphere with the same powder as described in Example VII. The last step of subjecting the grains after the application of the surface layer to the combined action of hydrogen chloride and air at elevated temperature takes very short time if porous iron is the carrier, the surface layer of ferric oxide being very quickly converted into ferrosic oxide; the entering hydrogen chloride air mixture is preheated to a temperature of at least 400° C. and the reactor is heated to a temperature of at least 450° C., preferably to about 490° C.

166 cc. of the above described contact mass are loaded into a vertical tube as described in Example VII; if the same initial reduction and induction steps are made, practically the same results are obtained as described in Example VII, and the temperature gradient between the centre and the wall of the reactor is small.

Similar contacts are also prepared with success by applying the active surface layer in the form of a metal powder to the impregnated cores of porous metals. Instead of reducing the ferric oxide powder after the formation of the porous surface layer, powdered iron itself is used immediately after it has been obtained by reduction of the oxide by means of hydrogen and is applied to the impregnated porous iron cores in an inert humid atmosphere, consisting for example of hydrogen, nitrogen or carbon dioxide containing water vapor. In an essentially analogous manner iron powder, prepared from iron carbonyl, can be applied.

It is known that for the synthesis of ammonia an iron catalyst is used which contains aluminium oxide or potassium oxide, or both of these compounds. Therefore if it is desired to apply my novel structure of iron catalysts for the ammonia synthesis, the same porous iron turnings disintegrated to the size within the range of 20 to 40 mesh as described in Example VIII are used. These porous iron grains are provided with the same impregnating inner ground layer of ferrous oxide as described in Example VIII. The composition of the layer differs, however, slightly. For example, the material for said surface layer contains about 95 per cent of ferric oxide and about 5 per cent of aluminium oxide, and can be prepared as described in Example VII by merely mixing the powders of said compounds in this proportion, or preferably by coprecipitation of these compounds, conversion of the precipitates, after washing and drying, into a powder of 325 mesh, and subsequently applying the same steps which have been described for the preparation of the iron catalyst with porous iron cores for the hydrogen-carbon monoxide reaction, in Example VIII. The grains coated with ferric oxide, or—as the case may be—with ferrosic oxide are loaded into a reactor for the synthesis of ammonia and both the surface and the impregnating ground layer of these grains are reduced in one of the known manners, e. g., by means of hydrogen at the suitable temperatures, preferably between 400° and 500°.

The results obtained by the application of these grains as catalysts are by far superior to those obtained with the iron catalysts prepared by the known methods.

It is known that for the oxidation of ethylene to ethylene oxide silver oxide is used as catalyst. According to my method a catalyst suitable for this reaction can be obtained by impregnating grains of pumice with silver nitrate, converting it into silver oxide, and subsequently forming a surface layer by shaking the impregnated grains in humid atmosphere with a powder of silver oxide of a size passing a sieve of 325 mesh.

It is known that for dehydration reactions aluminium oxide is used as a catalyst. An aluminium oxide catalyst of high efficiency can be prepared from any porous carrier material, porous grains of aluminium oxide included, and a surface layer of aluminium oxide powder prepared in accordance with my hereinbefore described process.

Other metals or alloys may be used and prepared in the same way, either for both or only for one of the inner impregnating ground layer and the active surface layer upon the carrier material. For example a nickel or a cobalt catalyst can be prepared by the same method.

The classes of reactions from which above examples were given widely differ from each other, and the same is true of the chemical compounds used as catalysts to bring about these reactions. The common feature, however, is the physical structure of said catalysts, the method to build them up and the resulting improvement of their efficiencies compared with such as obtained by other methods of preparation hitherto known.

Every one skilled in the art can adapt and vary the method of preparation so as to meet the physical and chemical properties of the catalytic active constituents and of the appropriate carrier material. For example, if aluminium chloride, zinc chloride or another deliquescent compound has to be applied as surface layer (aluminium chloride for alkylation, zinc chloride for chloromethylation) the application of the surface layer to the impregnated grains will be made with close control of the humidity of the atmosphere or even in dry air, depending on the original water content of these deliquescent substances.

It will be understood that, quite as the novel structure of catalytic masses and their novel method of preparation can be employed for the building up of catalytic masses from all solid chemical compounds and from all solid elements, they also can be used for all reactions for which the catalytic active constituents of which they are composed are appropriate, said novel structure increasing many-fold the efficiency of the catalytic masses without, of course, exerting any influence upon their activating properties the latter depending on the chemical composition, as outlined sub (2) and sub (1) in the second paragraph of this disclosure.

Although the examples given hereinbefore are chosen from reactions in the gaseous phase it will be understood that contact masses of the same physical structure can be employed for reactions in the liquid phase. The mechanical strength of the porous surface layer can be increased in conformity to the greater requirements for said mechanical strength of a porous material which has to resist the flow of liquids, by sintering or cohering as stated above. By choosing a coarser powder for the surface layer the size of the pores of the active surface can be increased so as to take into account the greater viscosity of liquids since the size of the pores of the surface layer depends on the size of the powder particles from which it is built up.

The hereinbefore described method of subjecting small particles of ferric oxide to the combined action of hydrogen chloride and oxygen at about 490° C. by which treatment cohering or baking together of the small particles of said powder is brought about, can be applied quite generally, and also for other purposes, to all metal oxides which are catalysts even to the smallest degree for the Deacon reaction.

This method has the great advantage to bring about coherence or baking together of small particles of metal oxide powders at much lower temperatures than are necessary to sinter same by heat treatment only. Another feature of this treatment at relatively low temperatures is that no pressure is needed for causing the coherence of the powder particles and the bodies to which they are shaped retain the same original great porosity as they have when built up loosely from particles of powder.

It will be understood that this method of causing the coherence of metal oxide particles is not confined to the preparation of catalytically active structures, but can be used for any other purpose where such porous bodies of metal oxides may advantageously be used.

However, this method also makes possible the preparation of shaped catalytic bodies which are built up throughout from powder particles without a supporting core. If a fine powder of metal oxide is shaped into spheres by employing low pressures as, for example, by means of the "Spheronizing Equipment" provided by James Russel Eng. Works, Inc., Boston, or by other similar equipment, these spheres have no mechanical strength and disintegrate readily. If, however, such spheres of metal oxide powder are subjected to a treatment with hydrogen chloride and oxygen at elevated temperatures according to my invention, the powder particles cohere firmly, so that the spheres exhibit sufficient mechanical strength for retaining their shape when loaded into a reactor. These spheres of cohered metal oxide powder can be used as catalysts for the reactions for which the metal oxide or the metal oxides of which they are composed are appropriate; they can also be subjected to a further treatment with a reducing gas at elevated temperatures until the metal oxide is substantially reduced to metal, and can subsequently serve as catalyst for the reactions for which the metal or the metals of which they are then composed are appropriate.

However, such catalytic bodies although they consist of metal oxide powder only, or—as the case may be—of metal powder only, are less efficient than catalytic bodies consisting of a supporting core and an active surface layer from the same powder, because when shaping the powder into bodies, even by employing very low pressures only, the pores, the inter-particle voids and the active inner surface are reduced considerably. Therefore, I prefer to apply catalytically efficient structures comprising a porous core as a support and to cover said cores with a porous surface layer consisting of the catalytically active substance the individual particles of which are made to cohere firmly but conserving at the same time the pores, the inter-particle voids and the same magnitude of the active inner surface of a layer of loose powder particles.

It is obvious that the method of preparing the novel structure of contacts may be varied to a considerable degree in many respects without departing from the scope and spirit of the invention.

For example:

The efficiency of the new contacts can be further improved by increasing the thickness of the active surface layer by repeating the steps by which it is produced.

In the treatment of the impregnated grains with the catalytic powder for the application of the active surface layer water vapor can be replaced by vapors of compounds which are adsorbed by the powder of the catalytic substance which is used as the active surface layer and by the substance which is employed for the inner bonding layer. As a rule vapors of substances having some polar affinity towards both the materials of the surface and of the bonding ground layer are suitable for this purpose, provided, however, that the adsorbed vapors can readily be desorbed by heating without formation of carbon black and without even partial decomposition. For example vapors of ethyl alcohol give quite good results for the preparation of a homogeneous porous surface layer from catalyst powder. Similarly suitable are vapors of methyl alcohol. It must, however, be avoided to wet, moisten or sprinkle the impregnated grains or the catalyst powder with the liquid the vapor of which is employed because the powder particles agglomerate irregularly and form small clumps at the spots where the impregnated grains or the catalyst powder are wetted, thus preventing the porous surface layer to become homogeneous. Surface layers which have become inhomogeneous in this way cause considerable reduction of the efficiency of the respective catalytic structure.

Instead of preparing the impregnating inner bonding ground layer by impregnating a porous support with a solution of a metal compound, and causing said solution to form a precipitate upon and within said support, the grains of the porous carrier material can be subjected to a gas stream consisting of or containing vapors of metal compounds, e. g., metal chlorides, which will be adsorbed by the porous supports and form an impregnating layer of metal chloride or chlorides which can be converted or not converted—as the case may be—into metal oxide or oxides.

For example, grains of silica gel are impregnated with anhydrous ferric chloride when subjected to a gas stream containing ferric chloride. The ferric chloride is converted into ferric oxide and the grains thus impregnated with ferric oxide are covered with a surface layer of powdered ferric oxide as described in my said copending patent application.

Aluminium chloride or zinc chloride vapors are adsorbed by porous carriers of alumina, or of silica gel. The resulting impregnating layer is converted into oxide in known manner, or—as the case may be—is used as such and without conversion into oxide as bonding agent for a surface layer consisting of powders of the chlorides or oxides of aforesaid metals.

Carrier bodies to the surface of which the powder particles of the surface layer adhere, can also be prepared by coprecipitating the carrier material together with the bonding material.

For example:

Aluminium oxide can be co-precipitated with ferric oxide, chromium oxide or with another oxide, washed, dried, sized and pelleted or pilled. Subsequently the active surface layer is applied in the form of powder in order to obtain the results hereinbefore described.

Silica gel and metal oxides can be co-precipitated from a prehydrolized solution of water glass and a solution of metal salts, i. e. silica and ferric hydroxide from prehydrolized water glass and ferric nitrate.

Ethyl ortho silicate is prehydrolyzed from a solution in ethyl alcohol by the addition of water. The sol immediately turns into gel by the addition of ferric oxide powder, occluding the ferric oxide and forming herewith a net like structure of silica and ferric oxide. This gel, when partially dried and pilled, forms bodies the structure of which resembles the structure of silica gel impregnated with ferric oxide. These bodies can serve as carrier for a subsequent coating with the surface layer of a metal oxide powder.

U. S. 2,382,581 describes the preparation of such bodies by co-precipitation of silica and chromium sesqui oxide from ethyl ortho silicate in the presence of chromium sesqui oxide. If such gel infiltrated with chromium sesqui oxide is partially dried, and pilled, metal oxide can be applied to as described above, to form a coherent active surface layer the catalytic efficiency of which is many times the efficiency of the pilled gel bodies without said surface layer.

Bodies prepared by precipitating metal oxides in the presence of powdered diatomaceous earth and by compounding the resulting mixture of metal oxides and impregnated diatomaceous earth into pills, are also excellent carriers to which an active surface layer in the form of powder can be applied. In this way the efficiency of this specific Fischer-Tropsch catalyst is substantially improved.

As a rule a substance will be suitable for the formation of the inner layer which is necessary for making the powder particles of the active surface layer adhere to the support, if it does not:

(a) Carbonize during the catalytic reaction;

(b) Evaporate under the said conditions;

(c) Poison the catalytic surface layer or have any other detrimental influence on the reaction;

For example if an active surface layer of ferric oxide is used, the bonding material must not contain sulfur in such form as to form iron sulfide with the ferric oxide of the surface layer.

(d) Change the stage of oxidation of the compound forming the active surface layer when subjected to the conditions of the reaction. If a metal oxide powder is to be used for oxidation and dehydrogenation reactions said metal oxide powder must not be reduced into its next lower degree of oxidation by the material of the bonding or ground layer. Vice versa, if a metal or an alloy powder is to be used for hydrogenation reactions said metal must not be oxidized by the compound forming the bonding or ground layer.

For certain reactions and certain metal oxides phosphoric acid is a suitable bonding material.

(e) Exhibit too strong a bonding power in order to avoid adherence of surface layers of adjacent grains to each other.

(f) Occlude the individual particles of the powder forming the active surface layer.

For example: Beads of glass or of porcelain, after having been submerged in a solution of barium oxide in absolute methyl alcohol, are made to fall through a current of hot air into a vessel containing the catalytic powder. If the height of the fall is properly adjusted the catalytic powder adheres to the beads, but the adherence of surface layers of adjacent grains to each other is avoided. The thickness of the layer of this first coating with metal oxide powder is increased by further agitating said beads with the metal oxide powder in humid atmosphere. The results with this contact structure, however, are not as good as with the contact structure prepared according to the preferred embodiment described in the given examples.

The term "oxygen" as used throughout the specification and the claims is meant to cover not only oxygen but also oxygen-containing gases, preferably air, and the term "hydrogen chloride" includes hydrogen chloride, moist or dry. All components of the gaseous mixtures may be used pure or mixed with other gases, and the term "mixture of co-precipitates" is meant to cover not only physical mixtures but also solid solutions.

I claim:

1. A contact mass consisting essentially of a support, a porous surface formed by a plurality of layers of coherent discrete catalyst particles, and associated with said support a bonding substance containing a hydrophilic metal compound bonding only the innermost layers of said porous surface to said support.

2. A contact mass consisting essentially of a porous support, a porous surface formed by a plurality of layers of coherent discrete particles containing a hydrophilic metal compound, and an intermediary layer containing a hydrophilic metal compound between said porous support and said porous surface.

3. A contact mass as claimed in claim 2, wherein the porous support is a non-metallic carrier material.

4. A contact mass as claimed in claim 2, wherein the porous support is a metallic carrier.

5. A contact mass as claimed in claim 2, wherein the porous support consists of a metal not reducing the metal compounds of the surface layer under the conditions of the reaction for which said contact mass is used as a catalyst.

6. A contact mass as claimed in claim 2, wherein the metal compound in the intermediary layer and the surface layers is essentially a metal oxide.

7. A metal oxide contact mass consisting of a porous support carrying the metal oxide in two physically different layers, said two layers comprising an outer surface layer having a dense spongy structure formed by coherent powdery particles of the oxide and an inner impregnating layer containing a hydrophilic metal oxide bonding the outer layer to the support.

8. A contact mass consisting essentially of a porous support and a porous surface formed on said support by a plurality of layers of coherent discrete particles containing a powdery metal catalyst, said support being impregnated with a hydrophilic metal compound.

9. A contact mass as claimed in claim 8, wherein the surface layers and the impregnating layer contain at least one metal of the iron group.

10. A contact mass as claimed in claim 8, comprising a porous metallic carrier.

11. A contact mass consisting essentially of a porous support and a porous surface formed on said support by a plurality of layers of coherent discrete particles containing a powdery metal catalyst, said support being impregnated with a reduced hydrophilic metal compound.

12. An iron oxide contact mass consisting essentially of a porous support, a coherent surface layer formed by powdery particles containing iron oxide as a major constituent, and an intermediate impregnation layer consisting essentially of iron oxide, said impregnation layer causing the adhesion of the surface layer to the support.

13. A method of bonding a powdery catalyst in a plurality of porous layers to the surface of the carriers of a contact mass, comprising the steps of combining the carriers with a hydrophilic metal compound bonding substance, drying, treating said dry carriers with a catalytic agent in powder form in the presence of vapors having a polar affinity to the bonding substance and to the catalytic powder and capable of being adsorbed by the bonding substance and the catalytic powder, and continuing said treatment until the carriers are completely and firmly covered with a multi-layer of said powder.

14. A method of bonding a powdery catalyst in a plurality of porous layers to the surface of the carriers of a contact mass, comprising the steps of combining the carriers with a hydrophilic metal compound bonding substance, drying, treating said dry carriers with a catalytic agent in powder form in the presence of water vapor, and continuing said treatment until the carriers are completely and firmly covered with a multi-layer of said powder.

15. A method of bonding a powdery catalyst in a plurality of porous layers to the surface of the carriers of a contact mass, comprising the steps of combining the carriers with a hydrophilic metal compound bonding substance, drying, treating said dry carriers with a catalytic agent in powder form in an atmosphere oversaturated with water vapor, and continuing said treatment until the carriers are completely and firmly covered with a multi-layer of said powder.

16. A method of bonding a powdery catalyst in a plurality of porous layers to the surface of the carriers of a contact mass, comprising the steps of combining the carriers with a hydrophilic metal compound bonding substance, drying, treating said dry carriers with a catalytic agent in powder form in the presence of organic vapors having a polar affinity to the bonding substance and to the catalytic powder and capable of being adsorbed by the bonding substance and the catalytic powder, and continuing said treatment until the carriers are completely and firmly covered with a multi-layer of said powder.

17. A method of preparing a contact mass composed of a carrier material covered with a porous surface multi-layer of catalytic powder, said method comprising the steps of coprecipitating the carrier material and a hydrophilic metal compound bonding substance suitable to cause the surface layer to adhere thereto, shaping the mixture of precipitated carrier material and bonding substance, drying said shaped carriers and subsequently treating the same in a humid atmosphere with a catalytic agent in powder form until they are completely and firmly covered with a coherent porous layer of said powder.

18. A method of preparing a contact mass suitable for catalytic reactions comprising the steps of impregnating a porous support with a hydrophilic metal compound and applying to said dry impregnated support in a humid atmosphere a firmly adherent porous layer of a catalytically active metal compound in powder form.

19. A method as claimed in claim 15 wherein the hydrophilic metal compound bonding substance and the added powder catalyst contain compounds having different metal components.

20. A method as claimed in claim 15 wherein the hydrophilic metal compound bonding substance and the added powder catalyst contain compounds having different metal components.

21. A method of preparing a contact mass suitable for catalytic reactions comprising the steps of applying to a porous support an impregnating layer of a hydrophilic metal compound, drying, and subsequently applying to said impregnated dried support a firmly adherent powdery multilayer surface of a catalytically active metal compound in the form of loose particles in the presence of an amount of water so limited as to be completely adsorbed by said layer-forming compounds without affecting the powdery packing of said particles.

22. A method of preparing a contact mass suitable for promoting catalytic reactions comprising the steps of impregnating a porous support with a solution of a metal compound, causing said solution to form a hydrophilic precipitate upon and within said support, removing the solvent, drying, and applying in a humid atmosphere to the surface of said dried impregnated support a firmly adherent porous layer of a similar metal compound in powdery form.

23. A method of preparing a contact mass suitable for promoting catalytic reactions comprising the steps of impregnating a porous support with a solution of a metal compound, causing said solution to form a hydrophilic precipitate upon and within said support, removing the solvent and the excess of precipitate, drying, and applying in a humid atmosphere to the surface of said dried impregnated support a firmly adherent porous layer of a similar metal compound in powdery form.

24. A method as claimed in claim 22 wherein the porous support is a non-metallic carrier material.

25. A method as claimed in claim 22 wherein the porous support is a metallic carrier material.

26. A method as claimed in claim 22 wherein the porous support consists of a metal not reducing the metal compounds of the surface layer when subjected to the conditions of the reaction for which said contact mass is used as a catalyst.

27. A method as claimed in claim 22 wherein the hydrophilic precipitate and the powdery metal compound is essentially a metal oxide.

28. A method as claimed in claim 22 wherein a porous metal support is used and the outer powdery layer consists essentially of a compound of the same metal.

29. A method as claimed in claim 22 wherein a porous metal support is used and the outer powdery layer consists essentially of a compound of a metal other than the support.

30. A method of preparing a contact mass suitable for promoting catalytic reactions comprising the steps of impregnating a porous support with the solution of a ferric compound, causing said solution to form upon and within said support a precipitate of a ferric compound forming ferric oxide on heating, drying said support, and applying in a humid atmosphere to the surface of said dried impregnated support a firmly adherent porous layer of powdery ferric oxide.

31. A method of preparing a contact mass suitable for promoting catalytic reactions comprising the steps of impregnating a porous support with a ferric chloride solution, converting the ferric chloride upon the support to ferric oxide, drying and agitating the impregnated support with additional ferric oxide powder in a humid atmosphere, thereby forming a firmly adherent surface layer of said ferric oxide upon the impregnated support.

32. A method of preparing a contact mass suitable for promoting catalytic reactions comprising the steps of impregnating a porous support with a ferric chloride solution, converting the ferric chloride upon the support to ferric oxide, subjecting the impregnated support to the combined action of hydrogen chloride and oxygen at elevated temperatures, and agitating the support with additional ferric oxide powder in a humid atmosphere, thereby forming a firmly adherent surface layer of said ferric oxide upon the impregnated support.

33. A method of bonding a powdery catalyst in a plurality of porous layers to the surface of the carriers of a contact mass, comprising the steps of combining the carriers with a hydrophilic metal compound bonding substance, drying, treating said dry carriers with a catalytic metal compound in powder form in the presence of vapors having a polar affinity to the bonding substance and to the catalytic powder and capable of being adsorbed by the bonding substance and the catalytic powder, continuing said treatment until the carriers are completely and firmly covered with a multi-layer of said powder, and treating the thus obtained coated mass with a reducing agent until said powder particles of said multi-layer are at least partially reduced to metal.

34. A method of preparing a contact mass suitable for catalytic reactions, comprising the steps of impregnating a porous support with a hydrophilic metal compound, drying the impregnated support, applying to said impregnated support in a humid atmosphere a firmly adherent layer of a similar metal compound in powder form and treating the thus obtained coated mass with hydrogen chloride and oxygen at elevated temperatures.

35. A method of preparing a contact mass suitable for promoting catalytic reactions comprising the steps of impregnating a porous support with a solution of a metal compound, causing said solution to form a hydrophilic precipitate upon and within said support, drying and applying in a humid atmosphere to said impregnated support a firmly adhering porous layer of a similar metal compound in powdery form, and subjecting said support to a heat treatment at elevated temperatures, which temperatures are substantially below the melting and sublimation point of said powdery metal compound forming the outer layer.

36. A method as claimed in claim 35 wherein said heat treatment is carried out in the presence of hydrogen chloride and oxygen.

37. A method of improving the efficiency of contact masses which consist of a carrier material in combination with a catalyst comprising the steps of treating said already catalytically active carriers additionally in a humid atmosphere with a catalyst in powder form until they are completely and firmly covered with a coherent porous layer of said powder and subsequently subjecting the thus obtained mass to a heat treatment at temperatures above about 200° C. but substantially below the melting and sublimation point of the catalyst.

38. A method as claimed in claim 37 wherein the heat treatment is carried out in the presence of hydrogen chloride and oxygen.

OTTO REITLINGER.

REFERENCES CITED

The following references are of record in the file of this patent:

UNITED STATES PATENTS

| Number | Name | Date |
| --- | --- | --- |
| 1,920,246 | Daudt | Aug. 1, 1933 |
| 1,979,187 | Bindley | Oct. 30, 1934 |
| 2,274,204 | Kipper | Feb. 24, 1942 |
| 2,341,995 | Kipper | Feb. 15, 1944 |
| 2,436,970 | Mistretta | Mar. 2, 1948 |